(12) United States Patent
Easter et al.

(10) Patent No.: US 6,944,964 B1
(45) Date of Patent: Sep. 20, 2005

(54) ADJUSTABLE TEMPLATE

(76) Inventors: Terry L. Easter, 1816 Charles St., Portsmouth, OH (US) 45662; Janet F. Easter, 1816 Charles St., Portsmouth, OH (US) 45662

( * ) Notice: Subject to any disclaimer, the term of this patent is extended or adjusted under 35 U.S.C. 154(b) by 2 days.

(21) Appl. No.: 10/916,841

(22) Filed: Aug. 13, 2004

(51) Int. Cl.⁷ .............................................. G01B 3/14
(52) U.S. Cl. ............................ 33/562; 33/528; 33/613
(58) Field of Search .................... 33/562, 613, 645, 33/760, 770, 528, DIG. 10, 333, 334, 1 K, 33/18.3, 427, 428, 464

(56) References Cited

U.S. PATENT DOCUMENTS

| | | | |
|---|---|---|---|
| 2,342,525 A * | 2/1944 | Berry ........................... | 355/74 |
| 3,526,947 A | 9/1970 | Pasek | |
| 3,690,013 A * | 9/1972 | Leptrone et al. .............. | 40/584 |
| 3,745,664 A | 7/1973 | Altseimer | |
| 3,842,510 A * | 10/1974 | Elliott .......................... | 33/528 |
| 3,888,013 A | 6/1975 | Benoit | |
| 4,228,592 A * | 10/1980 | Badger ........................ | 33/562 |
| 4,429,466 A * | 2/1984 | Leonard ....................... | 33/613 |
| 4,584,779 A * | 4/1986 | Wakamatsu .................. | 33/464 |
| 4,791,731 A * | 12/1988 | Dickinson et al. ............ | 33/528 |
| 4,942,670 A | 7/1990 | Brandt | |
| 4,953,733 A | 9/1990 | Loscuito | |
| 4,973,069 A * | 11/1990 | Edahiro et al. ........ | 280/124.142 |
| 5,388,337 A * | 2/1995 | Powers, II .................... | 33/273 |
| 6,173,503 B1 * | 1/2001 | Houghton et al. ............ | 33/454 |
| 6,473,984 B1 * | 11/2002 | Splain et al. ................. | 33/613 |
| 6,810,598 B2 * | 11/2004 | Boys ............................ | 33/528 |
| 6,811,131 B2 * | 11/2004 | Kuo ...................... | 248/346.03 |
| 6,826,846 B2 * | 12/2004 | Fordham ...................... | 33/562 |

* cited by examiner

Primary Examiner—Christopher W. Fulton
Assistant Examiner—Amy R. Cohen
(74) Attorney, Agent, or Firm—Donald R. Schoonover

(57) ABSTRACT

A template includes a base on which a plurality of wings are slidably mounted to move with respect to each other. The base also includes locks for locking the wings in positions. Levels, tape measures and markings are also on the base to assist with placement of the template.

6 Claims, 1 Drawing Sheet

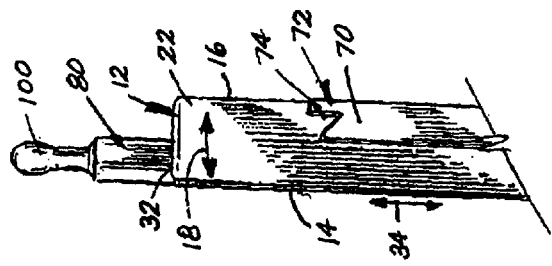
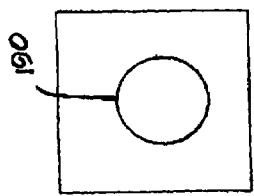
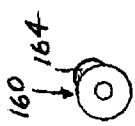
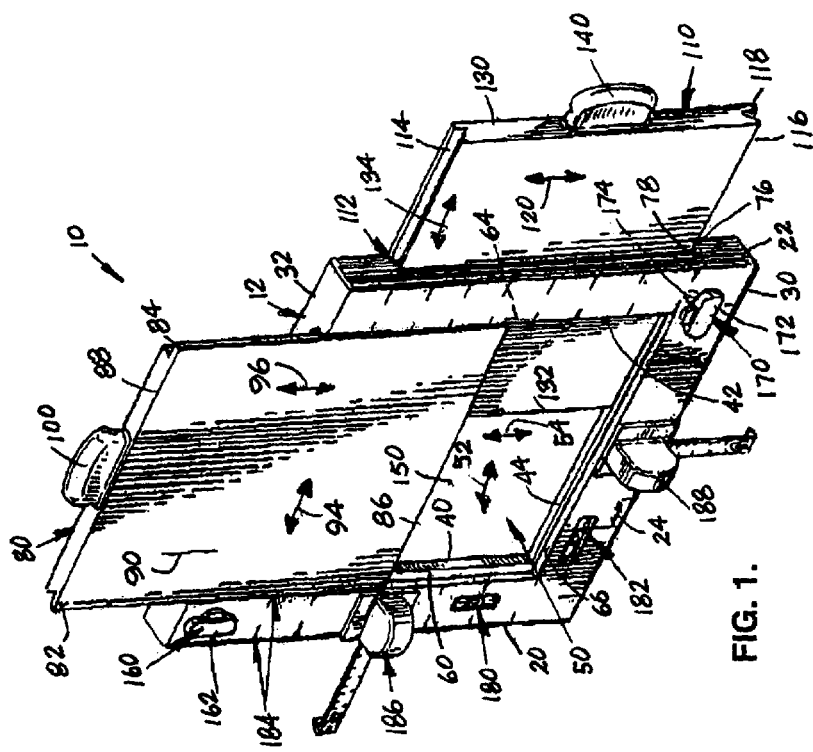

ADJUSTABLE TEMPLATE

BACKGROUND OF THE INVENTION

1. Field of the Invention

The present invention relates to the general art of geometric instruments, and to the particular field of gauges and templates.

2. Discussion of the Related Art

Many construction projects require cutting specifically sized and located holes in a substrate. For example, placing electrical outlets, electrical switches, and the like require specifically sized and located holes. Further examples include pipe outlets, conduit outlets and the like.

While the art contains many examples of templates, most of these templates have several drawbacks. For example, the presently available templates of which the inventor is aware, are not adjustable. That is, a template is specifically sized for a specific application, such as defining an opening for an electrical outlet, or the like. If other openings, or other sized or shaped openings are required, the template cannot be used for those openings and other templates are required. Thus, a worker may be required to have several templates in his possession for a single job. This is inconvenient and expensive.

Therefore, there is a need for a template that is adjustable so it can be used for a variety of tasks.

Still further, some of the templates of which the inventor is aware are not durable and some may not even be re-usable. This also requires a worker to have several templates which is also inconvenient and expensive, Therefore, there is a need for an adjustable template that is durable and re-usable.

Many of the templates of which the inventor is aware are not as accurate as possible. This is especially true of a template that is being used for a task for which it is not specifically designed. A skilled worker can account for this, but some less skilled workers may have difficulty and the final product may not be as finished as possible.

Therefore, there is a need for an adjustable template that is accurate, even for a variety of different applications.

Many templates must be used by holding the template in place with one hand and marking with the other. If the template is not securely held in place, the marked area may not be in a desired location. However, this may be difficult if the template is not durable and easily held in place.

Therefore, there is a need for an adjustable template that will remain securely in place.

PRINCIPAL OBJECTS OF THE INVENTION

It is a main object of the present invention to provide a template that is adjustable so it can be used for a variety of tasks.

It is another object of the present invention to provide an adjustable template that is durable and re-usable.

It is another object of the present invention to provide an adjustable template that is accurate, even for a variety of different applications.

It is another object of the present invention to provide an adjustable template that will remain securely in place.

SUMMARY OF THE INVENTION

These, and other, objects are achieved by an adjustable template that has a base with wings that are movable so a wide variety of shapes and sizes can be defined by moving the wings with respect to each other. The template also includes levels and markings so accurate placement can be effected.

Using the template embodying the present invention will permit a worker to adjust the template to the exact application and to obtain accurate and precise marks for the task at hand. The template is durable and thus is re-usable and is very adaptable to a wide variety of tasks whereby a single tool can be used for a wide variety of applications.

BRIEF DESCRIPTION OF THE DRAWING FIGURES

FIG. 1 is a perspective view of an adjustable template embodying the present invention.

FIG. 2 is a side elevational view of a portion of the template shown in FIG. 1.

FIG. 3 is a plan view of a locking element used to hold portions of the template in a selected position.

FIG. 4 is a plan view of an alternative form of a slide which can be used for marking arcuate guide lines.

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in an adjustable template 10. Adjustable template 10 comprises a base 12 which includes a first surface 14 that is a front surface when base 12 is in a use orientation such as shown in FIG. 1. Base 12 further includes a second surface 16 that is a rear surface when base 12 is in a use orientation. A thickness dimension 18 extends between first surface 14 and second surface 16.

Base 12 further includes a first side edge 20, a second side edge 22, and a width dimension 24 which extends between first side edge 20 and second side edge 22.

Base 12 further includes a first end edge 30, a second end edge 32, and a longitudinal dimension 34 which extends between first end edge 30 and second end edge 32.

A first inside edge 40 is located adjacent to first side edge 20, a second inside edge 42 is located adjacent to second side edge 22, and a third inside edge 44 is located adjacent to first end edge 30 of base 12.

An opening 50 is defined in base 12 by first inside edge 40, second inside edge 42, third inside edge 44, and second end edge 32. Opening 50 has a width dimension 52, which extends between first inside edge 40 and second inside edge 42, and a length dimension 54, that extends between third inside edge 44 and second end edge 32.

A first forward groove 60 is defined in first inside edge 40. First forward groove 60 intersects second end edge 32 and is located adjacent to first surface 14 of base 12.

A second forward groove 64 is defined in second inside edge 42. Second forward groove 64 intersects second end edge 32 and is located adjacent to first surface 14 of base 12.

A third forward groove 66 is defined in third inside edge 44. Third forward groove 66 intersects the first and second forward grooves 60, 64 and is located adjacent to first surface 14 of base 12.

A first side opening 70 is defined in second side edge 22 of base 12 near second surface 16 of base 12.

A first rear groove 72 is defined in second side edge 22 of base 12 adjacent to first side opening 70 and adjacent to rear surface 16 of base 12. First rear groove 72 includes a tongue element 74. A second rear groove 76 is defined in second side edge 22 of base 12 adjacent to first side opening 70 and adjacent to first end edge 30 of base 12 and adjacent to rear surface 16 of base 12. Second rear groove 76 extends adjacent to third forward groove 66 between second side edge 22 of base 12 and first inside edge 40 of base 12. Second rear groove 76 includes a tongue element 78.

Template 10 further includes a first wing element 80 movably mounted on base 12. First wing element 80 is slidably accommodated in the first forward groove 60, in the second forward groove 64, and in the third forward groove 66.

First wing element 80 has a first tongue element 82 that is slidably received in first forward groove 60, a second tongue element 84 that is slidably received in second forward groove 64 and a first end edge 86 which is sized and shaped to be accommodated in third forward groove 66. First wing element 80 further includes a second end edge 88 and a longitudinal axis 90 that extends between first end edge 86 and second end edge 88 of first wing element 80. A width dimension 94 extends between first tongue element 82 and second tongue element 84 and is essentially equal to width dimension 52 of opening 50. A length dimension 96 extends between first end edge 86 and second end edge 88 of first wing element 80. Length dimension 96 of first wing element 80 is greater than longitudinal dimension 34 of base 12.

A handle 100 is located on second end edge 88 of first wing element 80.

First wing element 80 is slidable between a first position in which first end edge 86 is accommodated in third forward groove 66 of base 12 and a second position shown in FIG. 1 in which first end edge 86 is spaced apart from third forward groove 66.

A second wing element 110 is movably mounted on base 12 and includes a first side edge 112 having a groove 114 defined therein and which is sized and shaped to slidably accommodate tongue element 74 of first rear groove 72 of base 12. A second side edge 116 has a groove 118 defined therein which is sized and shaped to slidably accommodate tongue element 78 of second rear groove 76 of base 12.

Second wing element 110 has a width dimension 120 which extends between first side edge 112 and second side edge 116. Width dimension 120 is less than length dimension 34 of base 12.

Second wing element 110 further includes a first end edge 130, a second end edge 132, and a length dimension 134 which extends between first end edge 130 of second wing element 110 and second end edge 132 of second wing element 110. Length dimension 134 of second wing element 110 is greater than width dimension 24 of base 12.

A handle 140 is located on first end edge 130 of second wing element 110.

Second wing element 110 is slidable between a first position with second end edge 132 in abutting contact with first inside edge 40 of base 12 and a second position shown in FIG. 1 with second end edge 132 spaced apart from the first inside edge of the base.

A template opening 150 is defined between first end edge 86 of first wing element 80, second end edge 132 of second wing element 110, third inside edge 44 of base 12, and first inside edge 40 of base 12 when the first and second wing elements 80, 110 are in the second positions thereof as shown in FIG. 1.

A first lock element 160 is located on base 12 and includes a handle 162 located on first surface 14 of the base 12 and a first wing element-engaging element, such as cam 164 shown in FIG. 3. As can be understood from the teaching of this disclosure, rotation of handle 162 will move cam 164 between a position which engages a surface of first wing element 80 and a position spaced apart from the surface of the first wing element. When the cam 164 engages the wing element 80, the wing element 80 will be locked in a position, and when the cam 164 is spaced apart from the wing element 80, the wing element 80 can slide. Once the wing element 80 is in a selected position, the handle 162 is operated so the wing element 80 will be locked in the selected position.

A second lock element 170 is similar to first lock element 160 and is located on base 12 and includes a handle 172 on the first surface 14 of base 12 and a second wing element-engaging element 174 which is identical to cam 164 discussed above. Lock element 170 operates with respect to second wing element 110 in a manner identical to the manner of operation of first lock element 160 and first wing element 80 and thus will not be discussed in detail.

A first bubble level 180 is located on base 12 adjacent to first side edge 20, and a second bubble level 182 is located on base 12 adjacent to first end edge 30.

A plurality of measuring markings, such as markings 184, are located on first surface 14 of base 12 adjacent to opening 50 adjacent to first side edge 20 of base 12 and adjacent to second side edge 22 of base 12.

A first tape measure 186 is rotatably mounted within a houing thereof, the first tape measure 186 being mounted on first surface 14 of base 12 adjacent to first side edge 20 and being extendable horizotally from the base 12, and a second tape measure 188 is rotatably mounted within a houing thereof, the second tape measure 18 being mounted on first surface 14 of base 12 adjacent to first end edge 30 of the base 12 and being extendable vertically from the base 12.

Use of template 10 will be understood from the teaching of this disclosure and thus will only briefly be discussed. Template 10 is positioned using tape measures 186 and 188, and levels 180 and 182 and opening 150 is defined by moving the wing elements 80 and 110 as well as markings 184. Locks 160 and 170 are operated to lock the wing elements 80, 110 in place and a guide line is drawn on a substrate using the edges of the wing elements 80, 110 and the base 12 as guides.

An alternative form of the template can include an arcuate opening 190 defined in one of the wing elements as shown in FIG. 4.

It is understood that while certain forms of the present invention have been illustrated and described herein, it is not to be limited to the specific forms or arrangements of parts described and shown.

What is claimed is:

1. An adjustable template comprising:
  (a) a base which includes
    (1) a first surface that is a front surface when said base is in a use orientation,
    (2) a second surface that is a rear surface when said base is in a use orientation,
    (3) a thickness dimension which extends between the first surface of said base and the second surface of said base,
    (4) a first side edge,
    (5) a second side edge,
    (6) a width dimension which extends between the first side edge of said base and the second side edge of said base,
    (7) a first end edge,
    (8) a second end edge, (9) a longitudinal dimension which extends between the first end edge of said base and the second end edge of said base,
(10) a first inside edge located adjacent to the first side edge of said base,
(11) a second inside edge located adjacent to the second side edge of said base,
(12) a third inside edge located adjacent to the first end edge of said base,
(13) an opening defined in said base by the first inside edge, the second inside edge, the third inside edge and the second end edge, the opening having a width dimension which extends between the first inside edge and the second inside edge and a length dimension that extends between the third inside edge and the second end edge,
(14) a first forward groove defined in the first inside edge, the first forward groove intersecting the second end edge and being located adjacent to the first surface of said base,
(15) a second forward groove defined in the second inside edge, the second forward groove intersecting the second end edge and being located adjacent to the first surface of said base,
(16) a third forward groove defined in the third inside edge, the third forward groove intersecting the first and second forward grooves and being located adjacent to the first surface of said base,
(17) a first side opening defined in the second side edge of said base near the second surface of said base,
(18) a first rear groove defined in the second side edge of said base adjacent to the first side opening and adjacent to the rear surface of said base, the first rear groove including a tongue element, and
(19) a second rear groove defined in the second side edge of said base adjacent to the first side opening and adjacent to the first end edge of said base and adjacent to the rear surface of said base, the second rear groove extending adjacent to the third forward groove between the second side edge of said base and the first inside edge of said base, the second rear groove including a tongue element;
(b) a first wing element movably mounted on said base in the first forward groove, in the second forward groove, and in the third forward groove, the first wing element having
(1) a first tongue element that is slidably received in the first forward groove,
(2) a second tongue element that is slidably received in the second forward groove,
(3) a first end edge which is sized and shaped to be accommodated in the third forward groove,
(4) a second end edge,
(5) a longitudinal axis that extends between the first end edge of said first wing element and the second end edge of said first wing element,
(6) a width dimension that extends between the first tongue element and the second tongue element and is essentially equal to the width dimension of the opening defined in said base,
(7) a length dimension that extends between the first end edge of said first wing element and the second end edge of said first wing element, the length dimension of said first wing element being greater than the longitudinal dimension of said base,
(8) a handle on the second end edge of said first wing element,
(9) said first wing element being slidable between a first position in which the first end edge of said first wing element is accommodated in the third forward groove of said base and a second position in which the first end edge of said first wing element is spaced apart from the third forward groove of said base;
(c) a second wing element movably mounted on said base and including
(1) a first side edge having a groove defined therein which is sized and shaped to slidably accommodate the tongue element of the first rear groove of said base,
(2) a second side edge having a groove defined therein which is sized and shaped to slidably accommodate the tongue element of the second rear groove of said base,
(3) a width dimension which extends between the first side edge of said second wing element and the second side edge of said second wing element, the width dimension of said second wing element being less than the length dimension of said base,
(4) a first end edge,
(5) a second end edge,
(6) a length dimension which extends between the first end edge of said second wing element and the second end edge of said second wing element, the length dimension of said second wing element being greater than the width dimension of said base,
(7) a handle on the first end edge of said second wing element, and
(8) said second wing element being slidable between a first position with the second end edge of said second wing element in abutting contact with the first inside edge of said base and a second position with the second end edge of said second wing element spaced apart from the first inside edge of said base;
(d) a template opening defined between the first end edge of said first wing element, the second end edge of said second wing element, the third inside edge of said base and the first inside edge of said base when said first and second wing elements are in the second positions thereof;
(e) a first lock element on said base which includes a handle on the first surface of said base and a first wing element-engaging element;
(f) a second lock element on said base which includes a handle on the first surface of said base and a second wing element-engaging element;
(g) a first bubble level on said base adjacent to the first side edge of said base;
(h) a second bubble level on said base adjacent to the first end edge of said base;
(i) a plurality of measuring markings on the first surface of said base adjacent to the opening defined in said base and adjacent to the first side edge of said base and adjacent to the second side edge of said base;
(j) a first tape measure rotatably mounted within a housing thereof, the first tape measure being mounted on the first surface of said base adjacent to the first side edge of said base; and
(k) a second tape measure rotatably mounted within a housing thereof, the second tape measure being mounted on the first surface of said base adjacent to the first end edge of said base.

2. The adjustable template as described in claim 1 further including an arcuate opening defined in at least one of the first and second wing elements.

3. An adjustable template comprising:
(a) a base having a first inside edge and a second inside edge;
(b) a first tape measure rotatably mounted within a housing thereof, the first tape measure being mounted on said base and being extendable horizontally therefrom;
(c) a second tape measure rotatable mounted within a housing thereof, the second tape measure being mounted on said base and being extendable vertically therefrom;
(d) a first wing element movably mounted on said base and having an end edge;
(e) a second wing element movably mounted on said base and having an end edge, the second wing element being movable at right angles to said first wing element;
(f) said first and second wing elements being spaced apart from each other, the end edge of said first wing element being located adjacent to the end edge of the second wing element and intersecting a plane containing the end edge of the first wing element;
(g) the end edges of said wing elements co-operating with the inside edges of said base to define an opening which is adjustable in said base.

4. The adjustable template as described in claim 3 further including a wing element lock on said base.

5. The adjustable template as described in claim 4 further including marking indicia on said base.

6. The adjustable template as described in claim 5 further including a bubble level on said base.

* * * * *